US012573185B2

(12) United States Patent
Das et al.

(10) Patent No.: US 12,573,185 B2
(45) Date of Patent: Mar. 10, 2026

(54) ADAPTIVE HUMAN INSTANCE SEGMENTATION WITH STEREO VIEW CONSISTENCY

(71) Applicant: QUALCOMM Incorporated, San Diego, CA (US)

(72) Inventors: Debasmit Das, San Diego, CA (US); Mohsen Ghafoorian, Diemen (NL); Oleksandr Bailo, Amstelveen (NL); Yu Fu, Zhongzheng District (TW); Hyojin Park, San Diego, CA (US); Shubhankar Mangesh Borse, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 285 days.

(21) Appl. No.: 18/463,756

(22) Filed: Sep. 8, 2023

(65) Prior Publication Data

US 2025/0086946 A1      Mar. 13, 2025

(51) Int. Cl.
$G06V\ 10/776$      (2022.01)
$G06T\ 7/11$      (2017.01)
(Continued)

(52) U.S. Cl.
CPC .............. G06V 10/776 (2022.01); G06T 7/11 (2017.01); G06T 7/174 (2017.01); G06T 7/85 (2017.01);
(Continued)

(58) Field of Classification Search
CPC ............... G06V 10/776; G06V 10/761; G06V 10/7753; G06T 7/11; G06T 7/174; G06T 7/85
See application file for complete search history.

(56) References Cited

U.S. PATENT DOCUMENTS 11,640,692 B1 * 5/2023 Gowda ................... G06T 7/194
                                          345/419
2022/0156943 A1 * 5/2022 Zhang ................... G06V 10/776
(Continued)

OTHER PUBLICATIONS

Cheng T., et al., "Sparse Instance Activation for Real-time Instance Segmentation", arXiv:2203.12827v1 [cs.CV], Proceedings of the IEEE/CVF Conference on Computer Vision and Pattern Recognition (CVPR), Mar. 24, 2022, pp. 1-10.
(Continued)

*Primary Examiner* — John R Wallace

(74) *Attorney, Agent, or Firm* — QUALCOMM Incorporated; Espartaco Diaz Hidalgo

(57) ABSTRACT

A system stores first and second images generated by first and second cameras; applies a segmentation model to the first image to generate a first segmentation mask identifying object instances; applies the segmentation model to the second image to generate a second segmentation mask identifying the object instances; projects the first segmentation mask to a viewpoint of the second camera to generate a first projected segmentation mask; converts the first projected segmentation mask and the second segmentation mask to first and second semantic masks, respectively; and computes a first similarity value based on the first and second semantic masks. This may be repeated exchanging the first and second images to compute a second similarity value. The system determines a loss value based on the first similarity value and the second similarity value and trains the segmentation model based on the loss value.

18 Claims, 4 Drawing Sheets

(51) Int. Cl.
    *G06T 7/174*       (2017.01)
    *G06T 7/80*        (2017.01)
    *G06V 10/74*      (2022.01)
    *G06V 10/774*     (2022.01)

(52) U.S. Cl.
    CPC ........ *G06V 10/761* (2022.01); *G06V 10/7753* (2022.01); *G06T 2207/10012* (2013.01); *G06T 2207/20012* (2013.01); *G06T 2207/20081* (2013.01); *G06T 2207/30196* (2013.01)

(56) References Cited

U.S. PATENT DOCUMENTS

2022/0292786 A1 *  9/2022  Pelzl ..................... G06T 19/006
2022/0410381 A1 *  12/2022  Stoppi ...................... G06T 7/50

OTHER PUBLICATIONS

Shamir R.R., et al., "Continuous Dice Coefficient: a Method for Evaluating Probabilistic Segmentations", Preprint: Apr. 25, 2018, pp. 1-4.

* cited by examiner

ADAPTIVE HUMAN INSTANCE SEGMENTATION WITH STEREO VIEW CONSISTENCY

TECHNICAL FIELD

This disclosure relates to systems for image segmentation.

BACKGROUND

Image segmentation is a technique that divides an image into multiple parts or regions. For example, image segmentation may be used to identify which parts of an image represent specific objects, such as individual people or individual vehicles. In general, an image segmentation process generates labels individual pixels of an image so that pixels having the same characteristics have the same labels. For example, each of the pixels in an image corresponding to an individual person may have the same label. A variety of segmentation models have been developed to perform image segmentation. These models include Mask R—CNN and others.

Image segmentation is useful in a wide variety of scenarios. For example, image segmentation may be used in autonomous driving applications. In another example, image segmentation may be used for extended reality (XR), such as mixed reality (MR) or augmented reality (AR). In another example, image segmentation may be used in robotics applications.

SUMMARY

In general, this disclosure describes techniques for adaptively training image segmentation models. Training a segmentation model may be difficult for several reasons. For example, there may be only a limited number of segmentation datasets with accurate ground truth annotations that are available for training, especially with respect to segmenting instances of humans in images. In another example, it may be difficult to obtain training dataset that cover a large variety of environments that may be encountered during deployment of the segmentation model. As a result of these challenges, there may be a need to use unlabeled data (i.e., data that was not manually labeled by a human) for training the segmentation model to account for distributions of data that are not covered by existing training datasets. However, the use of pseudo-labels (i.e., labels not generated by humans) on unlabeled data may contribute to noise and there would need to be a robust way to deal with that noise.

The techniques of this disclosure may address these challenges. As described herein, the techniques of this disclosure use consistency between left and right images of a stereoscopic camera to determine a loss value. The system may obtain the consistency between a predicted segmentation mask of a first view and a projected mask of a second view onto the first view. A system may use the loss value to further train a segmentation model.

In one example, a method of processing image data includes a system comprising: a storage system comprising one or more computer-readable media, the storage system configured to store a pair of stereoscopic images, the stereoscopic images including a first image generated by a first camera and a second image generated by a second camera; and one or more processors implemented in circuitry, the one or more processors configured to: apply a segmentation model to the first image to generate a first segmentation mask identifying one or more object instances; apply the segmentation model to the second image to generate a second segmentation mask identifying the one or more object instances; project the first segmentation mask to a viewpoint of the second camera to generate a first projected segmentation mask; convert the first projected segmentation mask to a first segmentation mask; convert the second segmentation mask to a second semantic mask and a second semantic mask, respectively; compute a first similarity value based on the first semantic mask and the second semantic mask; project the second segmentation mask to a viewpoint of the first camera to generate a second projected segmentation mask; convert the second projected segmentation mask to a third semantic mask; convert the first segmentation mask to a fourth semantic mask; compute a second similarity value based on the third semantic mask and the fourth semantic mask; determine a loss value based on the first similarity value and the second similarity value; and train the segmentation model based on the loss value.

In another example, this disclosure describes a method comprising: storing a pair of stereoscopic images, the stereoscopic images including a first image generated by a first camera and a second image generated by a second camera; and applying a segmentation model to the first image to generate a first segmentation mask identifying one or more object instances; applying the segmentation model to the second image to generate a second segmentation mask identifying the one or more object instances; projecting the first segmentation mask to a viewpoint of the second camera to generate a first projected segmentation mask; converting the first projected segmentation mask to a first semantic mask; converting the second segmentation mask to a second semantic mask; computing a first similarity value based on the first semantic mask and the second semantic mask; projecting the second segmentation mask to a viewpoint of the first camera to generate a second projected segmentation mask; converting the second projected segmentation mask to a third semantic mask; converting the first segmentation mask to a fourth semantic mask; computing a second similarity value based on the third semantic mask and the fourth semantic mask; determining a loss value based on the first similarity value and the second similarity value; and training the segmentation model based on the loss value.

In another example, this disclosure describes non-transitory computer-readable storage media having stored thereon instructions that, when executed, cause one or more processors to: store a pair of stereoscopic images, the stereoscopic images including a first image generated by a first camera and a second image generated by a second camera; and apply a segmentation model to the first image to generate a first segmentation mask identifying one or more object instances; apply the segmentation model to the second image to generate a second segmentation mask identifying the one or more object instances; project the first segmentation mask to a viewpoint of the second camera to generate a first projected segmentation mask; convert the first projected segmentation mask to a first semantic mask; convert the second segmentation mask to a second semantic mask; compute a first similarity value based on the first semantic mask and the second semantic mask; project the second segmentation mask to a viewpoint of the first camera to generate a second projected segmentation mask; convert the second projected segmentation mask to a third semantic mask; convert the first segmentation mask to a fourth semantic mask; compute a second similarity value based on the third semantic mask and the fourth semantic mask; determine a loss value based on the first similarity value and the second similarity value; and train the segmentation model based on the loss value.

The details of one or more examples are set forth in the accompanying drawings and the description below. Other features, objects, and advantages will be apparent from the description, drawings, and claims.

DETAILED DESCRIPTION

Training a segmentation model may be challenging for several reasons, including a lack of human-labeled training data sufficient to cover enough situations during deployment of the segmentation model. If the segmentation model is not sufficiently trained, the segmentation model may produce poor segmentation results, which can lead to further problems, especially in the context of autonomous navigation, robotics, and XR.

This disclosure describes techniques that may help to address these challenges. A computing system may obtain pairs of stereoscopic images. For instance, the system may obtain pairs of images from a first camera (e.g., a left image camera) and a second camera (e.g., a right image camera). Thus, the stereoscopic images may include a first image generated by a first camera and a second image generated by a second camera. The computing system may apply a segmentation model to the first image to generate a first segmentation mask identifying one or more object instances. Additionally, the computing system apply the segmentation model to the second image to generate a second segmentation mask identifying the one or more object instances. The computing system may project the first segmentation mask to a viewpoint of the second camera to generate a first projected segmentation mask. The computing system may then convert the first projected segmentation mask and the second segmentation mask to a first semantic mask and a second semantic mask, respectively.

The computing system may compute a first similarity value based on the first semantic mask and the second semantic mask. The computing system may also perform this operation for the second segmentation mask. Thus, the computing system may project the second segmentation mask to a viewpoint of the first camera to generate a second projected segmentation mask. The computing system may convert the second projected segmentation mask and the first segmentation mask to a third semantic mask and a fourth semantic mask, respectively. Additionally, the computing system may compute a second similarity value based on the third semantic mask and the fourth semantic mask. The computing system may determine a loss value based on the first similarity value and the second similarity value. The computing system may train the segmentation model based on the loss value.

By determining a loss value in this way and training the segmentation model based on this loss value in this way, the computing system may, in effect, reduce differences in segmentation between the stereoscopic images. This may effectively increase the number of training images. Increasing the number of training images in this way may increase the performance of the segmentation model without requiring more human-labeled images.

Figure 1:
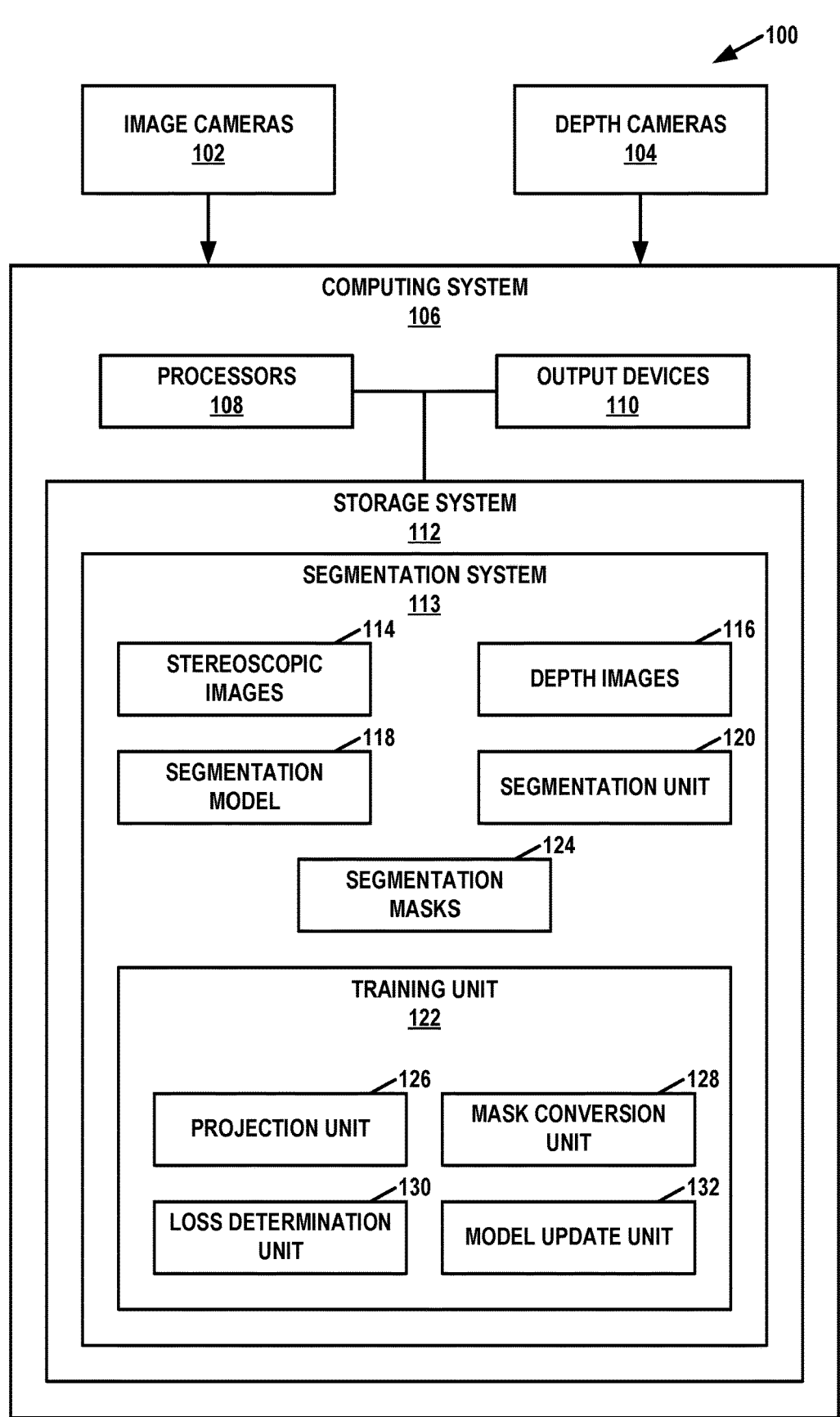
FIG. 1 is a block diagram illustrating an example system according to techniques of this disclosure.

FIG. 1 is a block diagram illustrating an example system 100 according to techniques of this disclosure. In various examples, system 100 may be part of a vehicle, smartphone, mobile device, computing device, robot, or other type of device. In the example of FIG. 1, system 100 includes a plurality of image cameras 102, a plurality of depth cameras 104, and a computing system 106. Computing system 106 may include one or more computing devices, such as personal computers, chipsets, mobile devices, or other types of devices.

Image cameras 102 are configured to generate image data, such as Red-Green-Blue (RGB) images or images in other color spaces. Image cameras 102 may be positioned at various locations around system 100. For instance, in an example where system 100 is a vehicle, image cameras 102 may include two or more forward-facing image cameras, two or more rear-facing image cameras, and so on.

Depth cameras 104 are configured to generate depth images. Depth images represent the depths of objects. In some examples, there is a depth camera for each of image cameras 102. For instance, in an example where image cameras 102 include a left image camera and a right image camera, depth cameras 104 may include a left depth camera corresponding to the left image camera and a right depth camera corresponding to the right image camera. Depth images generated by a depth camera may represent the depths of objects shown in images generated by an image camera corresponding to the depth camera.

In the example of FIG. 1, computing system 106 includes one or more processors 108, one or more output devices 110, and a storage system 112. Processors 108 may be implemented in circuitry. Example types of processors 108 may include microprocessors, digital signal processors, application-specific integrated circuits (ASICs), and so on. Output devices 110 may include display screens, XR display devices, and other devices for displaying output. In some examples, such as examples involving robotics or autonomous driving, output device 110 may include actuators to perform various physical actions. Storage system 112 may include one or more non-transitory computer-readable storage media. Example types of non-transitory computer-readable storage media may include random access memory (RAM) units, disk drives, and so on. Processors 108, output device 110, and the computer-readable storage media of storage system 112 may be distributed among two or devices of computing system 106, or may be consolidated within a single device of computing system 106.

Storage system 112 may be configured to store various types of data and computer-readable instructions. In the example of FIG. 1, storage system 112 stores data and instructions associated with a segmentation system 113, such as stereoscopic images 114 generated by image cameras 102. Storage system 112 may also store depth images 116 generated by depth cameras 104. Additionally, segmentation system 113 may also store a segmentation model 118. Segmentation model 118 may include data defining a model for segmenting images. In examples where segmentation model 118 is implemented using one or more artificial neural networks, the data defining segmentation model 118 may include input weights for parameters.

Storage system 112 may store computer-readable instructions of segmentation system 113 associated with a segmentation unit 120 and training unit 122. Processors 108 may execute instructions of segmentation unit 120 and training unit 122. Execution of instructions associated with segmentation unit 120 and training unit 122 may configure processors to perform the functionality ascribed in this disclosure to segmentation unit 120 and training unit 122. Thus, when this disclosure indicates that segmentation unit 120 or training unit 122 (or sub-units thereof) perform specific actions, this may be the result of processors 108 executing instructions associated with segmentation unit 120 or training unit 122. In other examples, specific actions described in this disclosure as being performed by segmentation unit 120 or training unit 122 (or sub-units thereof) may be performed by special purpose circuitry.

In general, segmentation unit 120 may apply segmentation model 118 to stereoscopic images 114 to generate segmentation masks 124. Storage system 112 may store segmentation masks 124. Each of segmentation masks 124 may identify one or more object instances within stereoscopic images 114. An object instance may be an instance of an object, such as an individual human, animal, vehicle, plant, barrier, building, or other type of object.

Training unit 122 may perform a process to adaptively train segmentation model 118. Training segmentation model 118 may improve the ability of segmentation model 118 to accurately segment images to identify object instances. In the example of FIG. 1, training unit 122 includes a projection unit 126, a mask conversion unit 128, a loss determination unit 130, and a model update unit 132.

As described in greater detail below, stereoscopic images 114 may include a pair of stereoscopic images that includes first image generated by a first image camera of image cameras 102 and a second image generated by a second image camera of image cameras 102. Segmentation unit 120 may apply segmentation model 118 to the first image to generate a first segmentation mask identifying one or more object instances. Additionally, segmentation unit 120 may apply segmentation model 118 to the second image to generate a second segmentation mask identifying the one or more object instances. Projection unit 126 of training unit 122 may project the first segmentation mask to a viewpoint of the second camera to generate a first projected segmentation mask.

Mask conversion unit 128 may convert the first projected segmentation mask and the second segmentation mask to a first semantic mask and a second semantic mask, respectively. In general, a semantic mask indicates object instances associated with locations in an image. A semantic mask differs from a segmentation mask in that there is not a dimension corresponding to different object instances. Loss determination unit 130 may compute a first similarity value based on the first semantic mask and the second semantic mask. Additionally, projection unit 126 may project the second segmentation mask to a viewpoint of the first camera to generate a second projected segmentation mask. Mask conversion unit 128 may convert the second projected segmentation mask and the first segmentation mask to a third semantic mask and a fourth semantic mask, respectively. Loss determination unit 130 may compute a second similarity value based on the third semantic mask and the fourth semantic mask. Additionally, loss determination unit 130 may determine a loss value based on the first similarity value and the second similarity value. Model update unit 132 may train segmentation model 118 based on the loss value.

The process performed by training unit 122 may allow segmentation model 118 to be trained with fewer human-labeled images. In essence, a projected segmentation mask projected to a given viewpoint and an original segmentation mask from an image generated from the given viewpoint should be substantially the same. Differences between the projected segmentation mask and the original segmentation mask may therefore be considered errors that can be used to further train segmentation model 118. The use of such errors to further train segmentation model 118 may avoid the need for segmentation model 118 to be trained using additional human-labeled images. Avoiding the need for segmentation model 118 to be trained using additional human-labeled images may reduce costs and may accelerate training of segmentation model 118. The techniques of this disclosure for adaptively training segmentation model 118 may be applied within a device that uses segmentation model 118 for image segmentation, e.g., with or without sending or receiving data from other devices. In other examples, training segmentation model 118 may be performed on a device separate from a device that uses segmentation model 118 for image segmentation.

Figure 2:
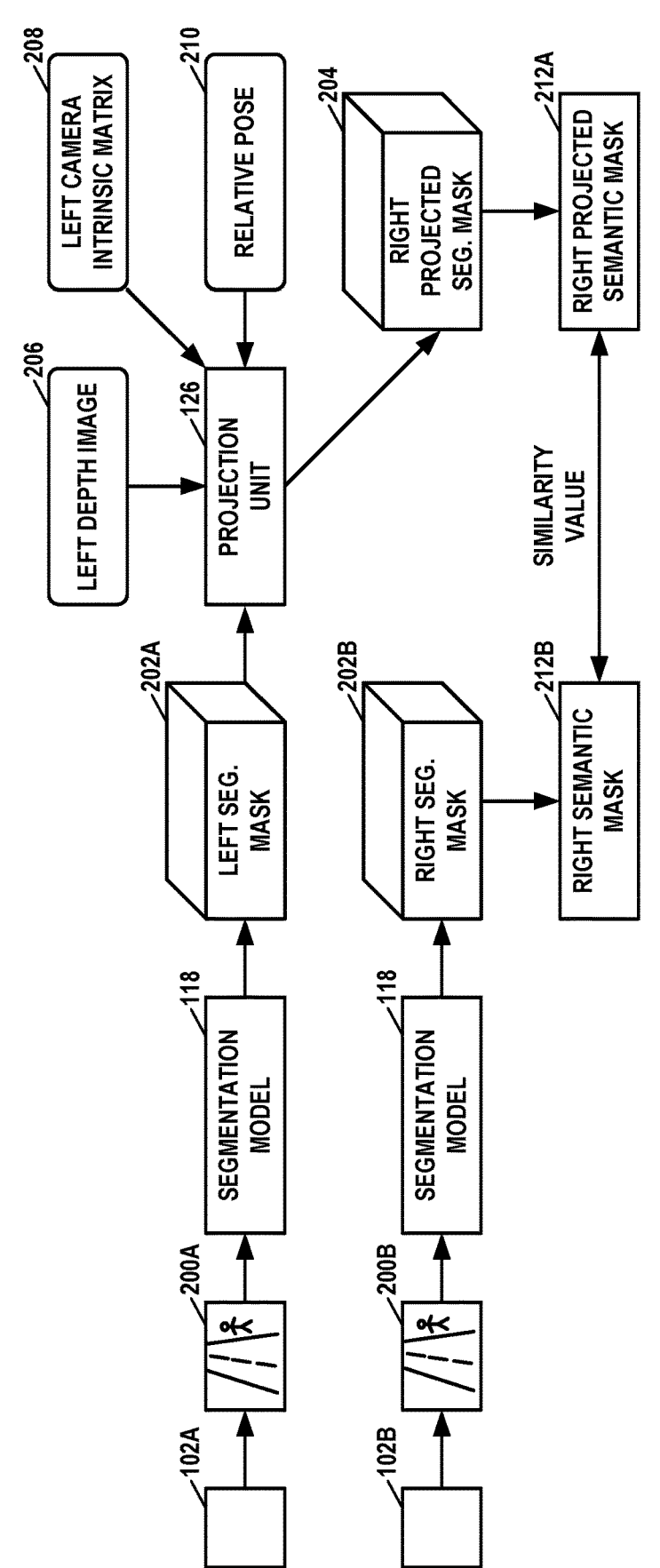
FIG. 2 is a block diagram illustrating an example process for generating a similarity value according to techniques of this disclosure.

FIG. 2 is a block diagram illustrating an example process for generating a similarity value according to techniques of this disclosure. In the example of FIG. 2, a left image camera 102A generates a left image 200A and a right image camera 102B generates a right image 200B. Left image 200A and right image 200B may be stereoscopic images in the sense that both left image 200A and right image 200B may be images of the same scene at the same time from different viewpoints. In the example of FIG. 2, it is assumed that left image camera 102A has a viewpoint that is to the left of the viewpoint of right image camera 102B. In other examples, left and right may be reversed.

Segmentation unit 120 may apply segmentation model 118 to left image 200A to generate a left segmentation mask 202A (i.e., a first segmentation mask). In FIG. 2 and elsewhere in this disclosure, "seg." is used as an abbreviation for "segmentation." Segmentation unit 120 may also apply segmentation model 118 to right image 200B to generate a right segmentation mask 202B. Segmentation model 118 may be implemented in one of a variety of ways. For instance, as described in greater detail elsewhere in this disclosure, segmentation model 118 may be implemented as a SparseInst segmentation model.

Projection unit 126 may then project left segmentation mask 202A to a viewpoint of right image camera 102B to generate a right projected segmentation mask 204. Conceptually speaking, right projected segmentation mask 204 is an estimate of how left segmentation mask 202A would appear if left segmentation mask 202A were generated from the viewpoint of right image camera 102B. Projection unit 126 may project left segmentation mask 202A to the viewpoint of right image camera 102B to generate right projected segmentation mask 204 based on a left camera intrinsic matrix 208 (i.e., a camera intrinsic matrix of left image camera 102A), a relative pose 210 of left image camera 102A and right image camera 102B, a left depth image 206, and left segmentation mask 202A. Left depth image 206 may be a depth image generated at the same time and substantially the same viewpoint as left image 200A. In general, a camera intrinsic matrix is a matrix for converting points from a camera coordinate system to a pixel coordinate system. Left camera intrinsic matrix 208 is a matrix for converting points from a coordinate system of left image camera 102A to a pixel coordinate system. The relative pose of left image camera 102A and right image camera 102B defines the positions of left image camera 102A relative to right image camera 102B. In some examples, projection unit 126 performs a matrix multiplication of left camera intrinsic matrix 208, a matrix representing the relative pose of left image camera 102A and right image camera 102B, a 2-dimensional (2D) array comprising left depth image 206, and left segmentation mask 202A. For instance, projection unit 126 may generate right projected segmentation mask 204 according to the following equation.

$$M_{l \to r} = KT_{l \to r}D_l K_l^{-1} M_l$$

In the equation above, $M_{l \to r}$ represents right projected segmentation mask 204, K represents left camera intrinsic matrix 208 of left image camera 102A, $T_{l \to r}$ represents the relative pose 210 of left image camera 102A and right image camera 102B, $D_l$ represents left depth image 206, $K^{-1}$ represents an inverse of left camera intrinsic matrix 208, and $M_l$ represents left segmentation mask 202A.

Furthermore, mask conversion unit 128 may convert right projected segmentation mask 204 and right segmentation mask 202B to a right projected semantic mask 212A and a right semantic mask 212B, respectively. In general, a semantic map is a 2-dimensional map that indicates object instances associated with locations in an image. The semantic map may be a 2-dimensional map or a 3-dimensional map. For example, right projected semantic mask 212A is a 2-dimensional map that indicates object instances associated with locations in the projected right image (i.e., an image estimated based on left image 200 projected to the viewpoint of right image cameras 102B). Similarly, right semantic mask 212B is a 2-dimensional map that indicates object instances associated with locations in right image 200B.

In some examples, right projected segmentation mask 204 includes a first array of values and right segmentation mask 202B includes a second array of values. Each of the first and second arrays of values have a width dimension, a height dimension, and an object instance dimension. For each 3D coordinate combination of width coordinates in the width dimension, height coordinates in the height dimension, and instance indexes in the object instance dimension, a value in the first array having the 3D coordinate combination indicates a level of confidence that a pixel at a width coordinate of the 3D coordinate combination and a height coordinate of the 3D coordinate combination in a first projected image belongs to an object instance having an instance index of the 3D coordinate combination. For example, a value in the first array at width coordinate w, height coordinate h, and object instance coordinate d may indicate a level of confidence that a pixel in the first projected image at width coordinate w and height coordinate h belongs to an object corresponding to object instance coordinate d. For instance, if object instance coordinate d corresponds to a specific person, the value in the first array at width coordinate w, height coordinate h, and object instance coordinate d may indicate a level of confidence that a pixel in left image 200A corresponds to the specific person. Furthermore, a value in the second array having the 3D coordinate combination indicates a level of confidence that a pixel at the width coordinate of the 3D coordinate combination and the height coordinate of the 3D coordinate combination in right image 200B belongs to the object instance having the instance index of the 3D coordinate combination.

For each 2D coordinate combination of the height coordinates in the height dimension and the width coordinates in the width dimension, mask conversion unit 128 may, as part of converting right projected segmentation mask 204 to right projected semantic mask 212A, identify a first array maximum value among values in the first array that have a height coordinate of the 2D coordinate combination and a width coordinate of the 2D coordinate combination. For example, there may be D values in the object instance dimension of right projected segmentation mask 204 at width coordinate w and height coordinate h. In this example, mask conversion unit 128 may determine which of the D values at width coordinate w and height coordinate h is greatest.

Additionally, mask conversion unit 128 may generate a ground-truth value by applying a threshold to the first array maximum value. For example, mask conversion unit 128 may set the ground-truth value equal to 1 if the first array maximum value is greater than (or greater than or equal to) to the threshold (e.g., 0.5 or another value) and may set the ground-truth value equal to 0 if the first array maximum value is less than (or less than or equal to) the threshold. In other examples, mask conversion unit 128 may set the ground-truth value to a value other than 0 or 1.

Mask conversion unit 128 may set a value in right projected semantic mask 212A at the height and width coordinates of the 2D coordinate combination to the ground-truth value. For example, when the 2D coordinate combination specifies a width coordinate w and a height coordinate h, mask conversion unit 128 may set a value in right projected semantic mask 212A at width coordinate w and height coordinate h to the ground-truth value.

As part of converting right segmentation mask 202B to right semantic mask 212B, mask conversion unit 128 may identify a second array maximum value among values in the second array that have the height and width coordinates of the 2D coordinate combination. For example, there may be D values in the object instance dimension of right segmentation mask 202B at width coordinate w and height coordinate h. In this example, mask conversion unit 128 may determine which of the D values in right segmentation mask 202B at width coordinate w and height coordinate h is greatest.

Mask conversion unit 128 may set a value in right semantic mask 212B at the height and width coordinates of the 2D coordinate combination to the second array maximum value. For example, when the 2D coordinate combination specifies a width coordinate w and a height coordinate h, mask conversion unit 128 may set a value in right semantic mask 212B at width coordinate w and height coordinate h to whichever of the D value in right segmentation mask 220B at width coordinate w and height coordinate h is greatest.

After mask conversion unit 128 has generated right projected semantic mask 212A and right semantic mask 212B, loss determination unit 130 may compute a first similarity value based on right projected semantic mask 212A and right semantic mask 212B. For example, mask conversion unit 128 may compute the first similarity value as a first Dice similarity value (DSC) with the first semantic mask as a first ground truth and the second semantic mask as a first prediction. A DSC is a statistic to gauge the similarity of two samples, such as the first semantic mask and the second semantic mask. A DSC may be used to compare the pixel-wise agreement between a predicted segmentation and a corresponding ground truth. Mask conversion unit 128 may use the following formula to compute a DSC.

$$DSC = \frac{2|A \cap B|}{c * |A| + |B|}$$

In the formula above, c can be computed as:

$$c = \frac{\sum a_i b_i}{\sum a_i \text{sign}(b_i)}$$

In the equations above, DSC is a continuous DSC, A is a predicted set (e.g., right projected semantic mask 212A), B is a ground truth set (e.g., right semantic mask 212B), ‖ indicates the cardinality of a set, c is a mean value of B over the values where both A and B are positive, a represents an individual value in A, and b represents an individual value in B. The sign( ) function may be defined as:

$$\text{sign}(x) = \begin{cases} 1 & \text{if } x > 0 \\ 0 & \text{if } x = 0 \\ -1 & \text{if } x < 0 \end{cases}$$

In another example, mask conversion unit 128 may use a binary cross-entropy value as a similarity value. For instance, mask conversion unit 128 may calculate a binary cross-entropy value from right semantic mask 212B and right projected semantic mask 212A.

Additionally, in the example of FIG. 2, training unit 122 may repeat the process described above while replacing left and right. Thus, projection unit 126 may generate a left projected segmentation mask (e.g., a second projected segmentation mask) based on right segmentation mask 202B, mask conversion unit 128 may generate a left projected semantic mask (e.g., a third semantic mask) based on the left projected segmentation mask, and a left semantic mask (e.g., a fourth semantic mask) based on left segmentation mask 202A.

Loss determination unit 130 may compute a second similarity value based on the left projected semantic mask and the left semantic mask. Loss determination unit 130 may determine a loss value based on the first similarity value and the second similarity value. For example, loss determination unit 130 may determine an intermediate loss value by adding the first similarity value and the second similarity value. In this example, loss determination unit 130 may determine the loss value by adding the intermediate loss value to a loss regularization factor. Inclusion of the loss regularization factor in the loss value may prevent trivial solutions. Thus, in some examples, loss determination unit 130 may calculate the loss value as shown in the following equations:

$$\mathcal{L}_{svc} = SegmentationLoss\left(M_{l \to r}^{sem}, M_{rgt}^{sem}\right) + Dice\left(M_{r \to l}^{sem}, M_{lgt}^{sem}\right)$$

$$\mathcal{L}_{tot} = \mathcal{L}_{svc} + \lambda \mathcal{L}_{reg}$$

where $\mathcal{L}_{svc}$ represents the intermediate loss value, SegmentationLoss( ) represents a function (e.g., a Dice loss function, binary cross-entropy loss, etc.) for calculating a similarity value, $M_{l \to r}^{sem}$ represents the semantic mask generated based on the projected segmentation mask generated by projecting left segmentation mask 202A to the viewpoint of right camera 102B, $M_{r_{gt}}^{sem}$ represents the semantic mask generated based on right segmentation mask 202B, $M_{r \to l}^{sem}$ represents the semantic mask generated based on the projected segmentation mask generated by projecting right segmentation mask 202B to the viewpoint of left image camera 102A, $M_{l_{gt}}^{sem}$ represents the semantic mask generated based on left segmentation mask 202A, $\mathcal{L}_{tot}$ represents the loss value, A represents a Lagrangian multiplier, and $\mathcal{L}_{reg}$ represents a loss regularization factor. In other examples, the loss value may be calculated in other ways.

Figure 3:
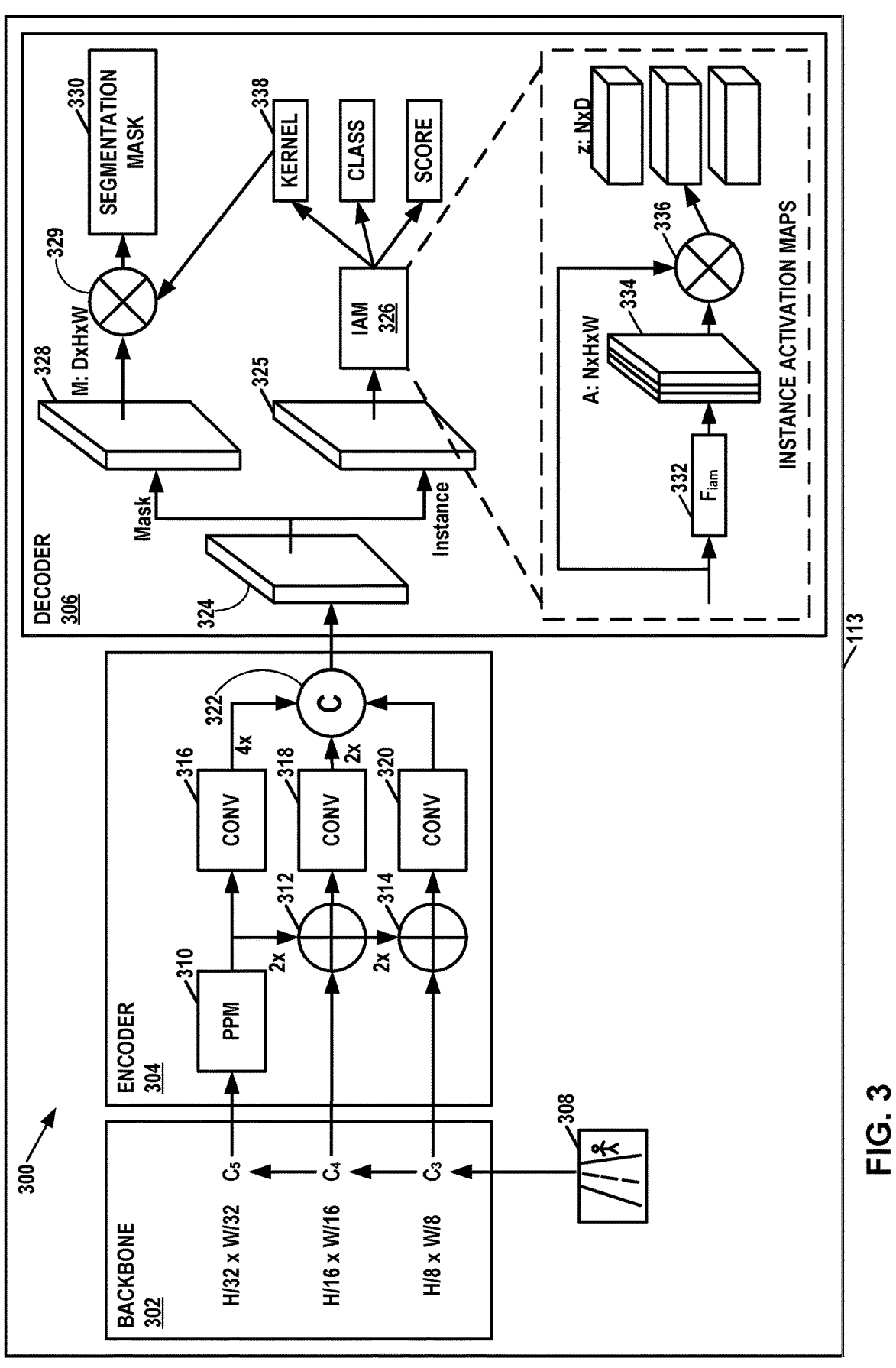
FIG. 3 is a block diagram illustrating an example segmentation model in a segmentation system according to techniques of this disclosure.

FIG. 3 is a block diagram illustrating an example segmentation model 300 in segmentation system 113 according to techniques of this disclosure. Segmentation model 300 may be an instance of segmentation model 118 (FIG. 1, FIG. 2). Although not shown in FIG. 3, segmentation system 113 may include the elements of segmentation system 113 shown in FIG. 2. In the example of FIG. 3, segmentation model 300 is implemented using a SparseInst architecture as described in Cheng et al., "Sparse Instance Activation for Real-Time Instance Segmentation" arXiv:2203.12827v1 [cs.CV]. In other examples, segmentation model 118 may be implemented using other architectures.

In the example of FIG. 3, segmentation model 300 includes a backbone component 302, an encoder component 304, and a decoder component 306. Backbone component 302 receives an input image 308 for segmentation. Backbone component 302 generates multiple scaled versions of input image 308 at different scales, labeled $C_3$, $C_4$, and $C_5$ in FIG. 3. In the example of FIG. 3, scaled image $C_3$ is scaled down by a factor of 8 in both the height and width dimensions, scaled image $C_4$ is scaled down by a factor of 16 in both the height and width dimensions, and scaled image $C_5$ is scaled down by a factor of 32 in both the height and width dimensions.

Encoder component 304 applies a pyramid pooling module (PPM) 310 to scaled image $C_5$. PPM 310 may enlarge a receptive field and fuse multi-scale features. In other words, PPM 310 may generate ensemble high-level feature maps that represent global context information of multiple scales. PPM 310 may apply different max pooling operations (e.g., 1×1, 2×2, 3×3, 6×6 max pooling operations) to the input, apply separate 2-dimensional convolution operations to the results of the max pooling operations, and then concatenate the results of the 2-dimensional convolution operations with the original input to PPM 310.

Additionally, a summation unit 312 of encoder component 304 may combine $C_4$ with 2× up-sampled output of PPM 310. A summation unit 314 of encoder component 304 may combine $C_3$ with 2× up-sampled output of summation unit 312. Encoder component 304 may apply a first convolutional network 316 to the output of PPM 310, a second convolutional network 318 to the output of summation unit 312, and a third convolutional network 320 to the output of summation unit 314. Convolutional networks 316, 318, and 320 may apply 3×3 convolution. A concatenation unit 322 of encoder component 304 may concatenate a 4× up-sampled output of convolutional network 316, a 2× up-sampled output of convolutional network 318, and the output of convolutional network 320, thereby generating a 3-dimensional array 324. Decoder component 306 has two branches: an instance branch and a mask branch.

In the instance branch, 3-dimensional array 324 may be provided as input to an instance activation map (IAM) module 326. IAM 326 predicts activation maps to acquire instance features for recognition and mask kernels. The mask branch includes a convolutional network 328 that generates mask features M. Convolutional network 328 may be a 3×3 stack of convolutions with 256 channels. Decoder component 306 includes a multiplier unit 329 that multiplies the mask features with predicted kernels 338 generated by the instance branch to generate a segmentation mask 330.

Instance activation maps are instance-aware maps that highlight informative regions for objects. An array 325 is input to IAM module 326. Array 325 may be a copy of array 324. IAM module 326 may apply $F_{iam}$ 332 to array 325. $F_{iam}$ 332 is a neural network (e.g., a 3×3 convolution) with sigmoid non-linearity. The output of $F_{iam}$ 332 is denoted in FIG. 3 as A and may be an array dimensions N×H×W, where N is a number of instance maps, H and W are a height and width, respectively. IAM module 326 may then apply three linear layers 334 to the output of $F_{iam}$ 332. Each of the linear layers applies a linear transform to incoming data, such as the output of $F_{iam}$ 332. A multiplication unit 336 of IAM module 326 may multiply the output of the linear layers 334 with array 325 to obtain an array of classification values, an array of objectness score values, and a mask kernel. $F_{iam}$ 332 generates instance activation maps.

Figure 4:
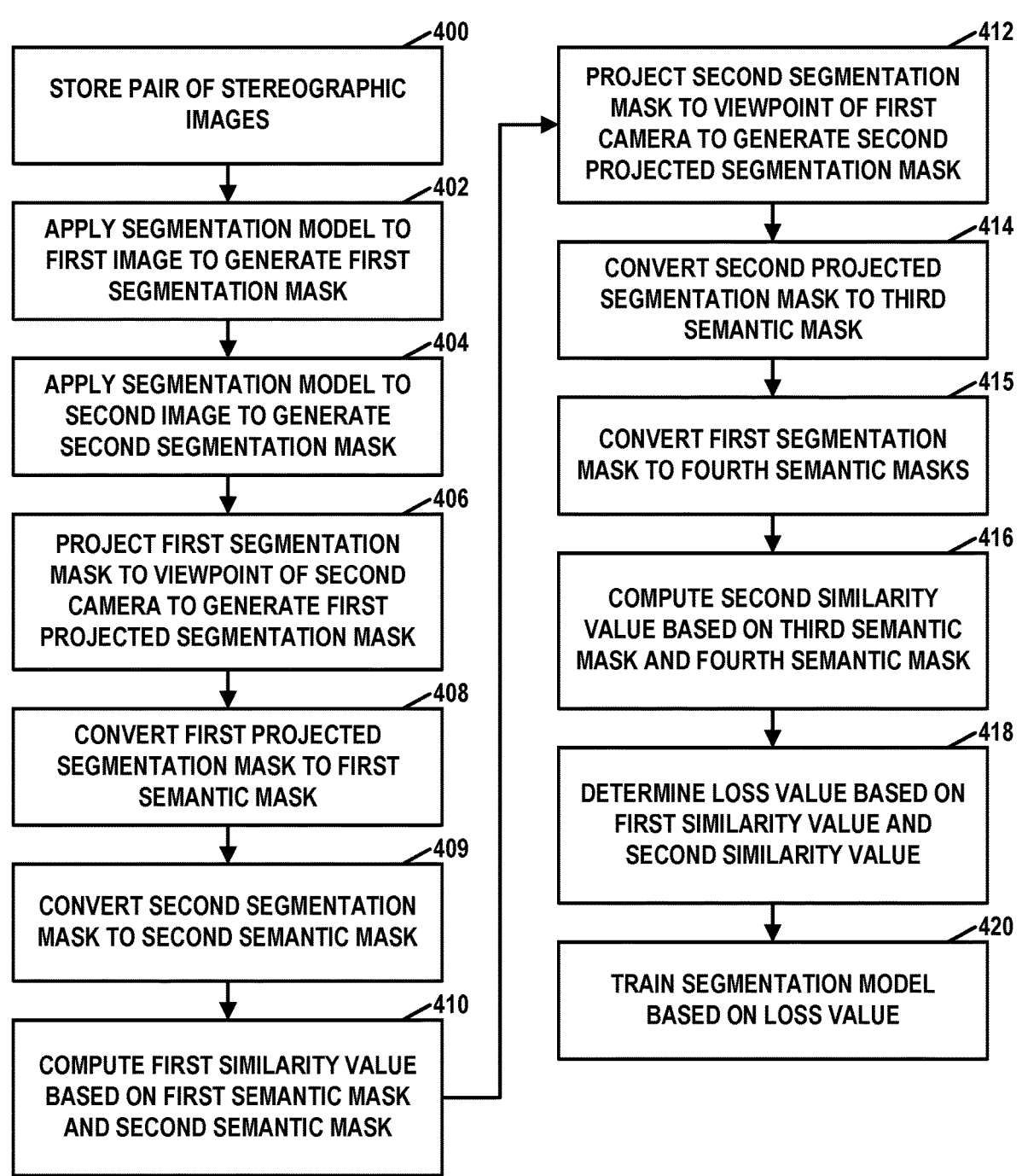
FIG. 4 is a flowchart illustrating an example method according to techniques of this disclosure.

FIG. 4 is a flowchart illustrating an example method according to techniques of this disclosure. In the example of FIG. 4, storage system 112 may store a pair of stereographic images, including a first image (e.g., left image 200A) generated by a first image (e.g., left image camera 102A) and a second image (e.g., right image 200B) generated by a second image camera (e.g., right image camera 102B) (400). Furthermore, segmentation unit 120 may apply segmentation model 118 to the first image to generate a first segmentation mask (e.g., left segmentation mask 202A) identifying one or more object instances (402). Segmentation unit 120 may apply segmentation model 118 to the second image to generate a second segmentation mask (e.g., right segmentation mask 202B) identifying the one or more object instances (404).

Projection unit 126 may project the first segmentation mask to a viewpoint of the second image camera to generate a first projected segmentation mask (e.g., right projected segmentation mask 204) (406). Projection unit 126 may generate the first projected segmentation mask according to the examples provided elsewhere in this disclosure. For instance, projection unit 126 may obtain a first depth image (e.g., left depth image 206) representing estimates of depths in the first image. Projection unit 126 may project the first segmentation mask to the viewpoint of the second camera to generate the first projected segmentation mask based on a camera intrinsic matrix of the first camera, a relative pose of the first camera and the second camera, the first depth image, and the first segmentation mask. Computing system 106 may include a second depth camera configured to generate the second depth image. In some examples, projection unit 126 may perform a matrix multiplication of the camera intrinsic matrix of the first camera, a matrix representing the relative pose of the first camera and the second camera, a 2-dimensional (2D) array comprising the first depth image, an inverse of the camera intrinsic matrix of the first camera, and the first segmentation mask.

Mask conversion unit 128 may convert the first projected segmentation mask to a first semantic mask (e.g., right projected semantic mask 212A) (408). Additionally, mask conversion unit 128 may convert the second segmentation mask to a second semantic mask (e.g., right semantic mask 212) (409). Mask conversion unit 128 may convert the segmentation masks to semantic masks in accordance with the examples provided elsewhere in this disclosure.

Loss determination unit 130 may compute a first similarity value based on the first semantic mask and the second semantic mask (410). In some examples, loss determination unit 130 may compute the first similarity value as a first Dice similarity value with the first semantic mask as a first ground truth and the second semantic mask as a first prediction.

Furthermore, projection unit 126 may project the second segmentation mask (e.g., right segmentation mask 202B) to a viewpoint of the first image camera (e.g., image camera 102A) to generate a second projected segmentation mask (412). For instance, projection unit 126 may obtain a second depth image representing estimates of depths in the second image and may project the second segmentation mask to the viewpoint of the first camera to generate the second projected segmentation mask based on a camera intrinsic matrix of the second camera, the relative pose of the first camera and the second camera, the second depth image, and the second segmentation mask. Computing system 106 may include a second depth camera configured to generate the second depth image. In some examples, projection unit 126 may perform a matrix multiplication of the camera intrinsic matrix of the second camera, the matrix representing the relative pose of the first camera and the second camera, a 2-dimensional (2D) array comprising the second depth image, an inverse of the camera intrinsic matrix of the second camera, and the second segmentation mask.

Mask conversion unit 128 may convert the second projected segmentation mask to a third semantic mask (414). Additionally, mask conversion unit 128 may convert the first segmentation mask (e.g., left segmentation mask 202A) to a fourth semantic mask (415). Thus, in some examples, the first projected segmentation mask includes a first array of values, the second segmentation mask includes a second array of values, the second projected segmentation mask includes a third array of values, the first segmentation mask includes a fourth array of values, and each of the first, second, third, and fourth arrays of values has a width dimension, a height dimension, and an object instance dimension. For each 3D coordinate combination of width coordinates in the width dimension, height coordinates in the height dimension, and instance indexes in the object instance dimension:

a value in the first array having the 3D coordinate combination indicates a level of confidence that a pixel at a width coordinate of the 3D coordinate combination and a height coordinate of the 3D coordinate combination in a first projected image belongs to an object instance having an instance index of the 3D coordinate combination, a value in the second array having the 3D coordinate combination indicates a level of confidence that a pixel at the width coordinate of the 3D coordinate combination and the height coordinate of the 3D coordinate combination in the second image belongs to the object instance having the instance index of the 3D coordinate combination, a value in the third array having the 3D coordinate combination indicates a level of confidence that a pixel at the width coordinate of the 3D coordinate combination and the height coordinate of the 3D coordinate combination in a second projected image belongs to the object instance having the instance index of the 3D coordinate combination, and a value in the fourth array having the 3D coordinate combination indicates a level of confidence that a pixel at the width coordinate of the 3D coordinate combination and the height coordinate of the 3D coordinate combination in the first image belongs to the object instance having the instance index of the 3D coordinate combination, For each 2-dimensional (2D) coordinate combination of the height coordinates in the height dimension and the width coordinates in the width dimension, mask conversion unit 128 may, as part of converting the first projected segmentation mask to the first semantic mask, identify a first array maximum value among values in the first array that have a height coordinate of the 2D coordinate combination and a width coordinate of the 2D coordinate combination, generate a ground-truth value by applying a threshold to the first array maximum value, and set a value in the first semantic mask at the height and width coordinates of the 2D coordinate combination to the ground-truth value. Furthermore, as part of converting the second segmentation mask to the second semantic mask, mask conversion unit 128 may identify a second array maximum value among values in the second array that have the height and width coordinates of the 2D coordinate combination, set a value in the second semantic mask at the height and width coordinates of the 2D coordinate combination to the second array maximum value. As part of converting the second projected segmentation mask to the third semantic mask, mask conversion unit 128 may identify a third array maximum value among values in the third array that have the height and width coordinates of the 2D coordinate combination, generate a ground-truth value by applying the threshold to the third array maximum value; and set a value in the third semantic mask at the height and width coordinates of the 2D coordinate combination to the ground-truth value. As part of converting the first segmentation mask to the fourth semantic mask, mask conversion unit 128 may identify a fourth array maximum value among values in the fourth array that have the height and width coordinates of the 2D coordinate combination, set a value in the fourth semantic mask at the height and width coordinates of the 2D coordinate combinations to the fourth array maximum value.

Loss determination unit 130 may compute a second similarity value based on the third semantic mask and the fourth semantic mask (416). In some examples, loss determination unit 130 may compute the second similarity value as a second Dice similarity value with the third semantic mask as a second ground truth and the fourth semantic mask as a second prediction. Additionally, loss determination unit 130 may determine a loss value based on the first similarity value and the second similarity value (418). Loss determination unit 130 may determine the loss value as described elsewhere in this disclosure. For instance, loss determination unit 130 may determine the loss value based on the first similarity value, the second similarity value, and a loss regularization factor.

Model update unit 132 may train segmentation model 118 based on the loss value (420). For example, model update unit 132 may use the loss value in a backpropagation process that updates weights of inputs to neurons in segmentation model 118.

Various examples of the techniques of this disclosure are summarized in the following clauses.

Clause 1. A system comprising: a storage system comprising one or more computer-readable media, the storage system configured to store a pair of stereoscopic images, the stereoscopic images including a first image generated by a first camera and a second image generated by a second camera; and one or more processors implemented in circuitry, the one or more processors configured to: apply a segmentation model to the first image to generate a first segmentation mask identifying one or more object instances; apply the segmentation model to the second image to generate a second segmentation mask identifying the one or more object instances; project the first segmentation mask to a viewpoint of the second camera to generate a first projected segmentation mask; convert the first projected segmentation mask to a first segmentation mask; convert the second segmentation mask to a second semantic mask and a second semantic mask, respectively; compute a first similarity value based on the first semantic mask and the second semantic mask; project the second segmentation mask to a viewpoint of the first camera to generate a second projected segmentation mask; convert the second projected segmentation mask to a third semantic mask; convert the first segmentation mask to a fourth semantic mask; compute a second similarity value based on the third semantic mask and the fourth semantic mask; determine a loss value based on the first similarity value and the second similarity value; and train the segmentation model based on the loss value.

Clause 2. The system of claim 1, wherein the one or more processors are configured to: obtain a first depth image representing estimates of depths in the first image; obtain a second depth image representing estimates of depths in the second image; project the first segmentation mask to the viewpoint of the second camera to generate the first projected segmentation mask based on a camera intrinsic matrix of the first camera, a relative pose of the first camera and the second camera, the first depth image, and the first segmentation mask; and project the second segmentation mask to the viewpoint of the first camera to generate the second projected segmentation mask based on a camera intrinsic matrix of the second camera, the relative pose of the first camera and the second camera, the second depth image, and the second segmentation mask.

Clause 3. The system of claim 2, further comprising: a first depth camera configured to generate the first depth image; and a second depth camera configured to generate the second depth image.

Clause 4. The system of any one of claims 2-3, wherein the one or more processors are configured to: as part of projecting the first segmentation mask, perform a matrix multiplication of the camera intrinsic matrix of the first camera, a matrix representing the relative pose of the first camera and the second camera, a 2-dimensional (2D) array comprising the first depth image, an inverse of the camera intrinsic matrix of the first camera, and the first segmentation mask, and as part of projecting the second segmentation mask, perform a matrix multiplication of the camera intrinsic matrix of the second camera, the matrix representing the relative pose of the first camera and the second camera, a 2-dimensional (2D) array comprising the second depth image, an inverse of the camera intrinsic matrix of the second camera, and the second segmentation mask.

Clause 5. The system of any one of claims 1-4, wherein the one or more processors are configured to determine the loss value based on the first similarity value, the second similarity value, and a loss regularization factor.

Clause 6. The system of any one of claims 1-5, wherein: the first projected segmentation mask includes a first array of values, the second segmentation mask includes a second array of values, the second projected segmentation mask includes a third array of values, the first segmentation mask includes a fourth array of values, each of the first, second, third, and fourth arrays of values has a width dimension, a height dimension, and an object instance dimension, for each 3-dimensional (3D) coordinate combination of width coordinates in the width dimension, height coordinates in the height dimension, and instance indexes in the object instance dimension: a value in the first array having the 3D coordinate combination indicates a level of confidence that a pixel at a width coordinate of the 3D coordinate combination and a height coordinate of the 3D coordinate combination in a first projected image belongs to an object instance having an instance index of the 3D coordinate combination, a value in the second array having the 3D coordinate combination indicates a level of confidence that a pixel at the width coordinate of the 3D coordinate combination and the height coordinate of the 3D coordinate combination in the second image belongs to the object instance having the instance index of the 3D coordinate combination, a value in the third array having the 3D coordinate combination indicates a level of confidence that a pixel at the width coordinate of the 3D coordinate combination and the height coordinate of the 3D coordinate combination in a second projected image belongs to the object instance having the instance index of the 3D coordinate combination, and a value in the fourth array having the 3D coordinate combination indicates a level of confidence that a pixel at the width coordinate of the 3D coordinate combination and the height coordinate of the 3D coordinate combination in the first image belongs to the object instance having the instance index of the 3D coordinate combination, for each 2-dimensional (2D) coordinate combination of the height coordinates in the height dimension and the width coordinates in the width dimension, the one or more processors are configured to: as part of converting the first projected segmentation mask to the first semantic mask: identify a first array maximum value among values in the first array that have a height coordinate of the 2D coordinate combination and a width coordinate of the 2D coordinate combination; generate a ground-truth value by applying a threshold to the first array maximum value; and set a value in the first semantic mask at the height and width coordinates of the 2D coordinate combination to the ground-truth value; as part of converting the second segmentation mask to the second semantic mask: identify a second array maximum value among values in the second array that have the height and width coordinates of the 2D coordinate combination; set a value in the second semantic mask at the height and width coordinates of the 2D coordinate combination to the second array maximum value; as part of converting the second projected segmentation mask to the third semantic mask: identify a third array maximum value among values in the third array that have the height and width coordinates of the 2D coordinate combination; generate a ground-truth value by applying the threshold to the third array maximum value; and set a value in the third semantic mask at the height and width coordinates of the 2D coordinate combination to the ground-truth value; and as part of converting the first segmentation mask to the fourth semantic mask: identify a fourth array maximum value among values in the fourth array that have the height and width coordinates of the 2D coordinate combination; and set a value in the fourth semantic mask at the height and width coordinates of the 2D coordinate combinations to the fourth array maximum value.

Clause 7. The system of any one of claims 1-6, wherein the one or more processors are configured to: compute the first similarity value as a first Dice similarity value with the first semantic mask as a first ground truth and the second semantic mask as a first prediction; and compute the second similarity value as a second Dice similarity value with the third semantic mask as a second ground truth and the fourth semantic mask as a second prediction.

Clause 8. The system of any one of claims 1-7, wherein the segmentation model is implemented using a SparseInst architecture.

Clause 9. A method comprising: storing a pair of stereoscopic images, the stereoscopic images including a first image generated by a first camera and a second image generated by a second camera; and applying a segmentation model to the first image to generate a first segmentation mask identifying one or more object instances; applying the segmentation model to the second image to generate a second segmentation mask identifying the one or more object instances; projecting the first segmentation mask to a viewpoint of the second camera to generate a first projected segmentation mask; converting the first projected segmentation mask to a first semantic mask; converting the second segmentation mask to a second semantic mask; computing a first similarity value based on the first semantic mask and the second semantic mask; projecting the second segmentation mask to a viewpoint of the first camera to generate a second projected segmentation mask; converting the second projected segmentation mask to a third semantic mask; converting the first segmentation mask to a fourth semantic mask; computing a second similarity value based on the third semantic mask and the fourth semantic mask; determining a loss value based on the first similarity value and the second similarity value; and training the segmentation model based on the loss value.

Clause 10. The method of claim 9, wherein: the method further comprises: obtaining a first depth image representing estimates of depths in the first image; and obtaining a second depth image representing estimates of depths in the second image; projecting the first segmentation mask comprises projecting the first segmentation mask to the viewpoint of the second camera to generate the first projected segmentation mask based on a camera intrinsic matrix of the first camera, a relative pose of the first camera and the second camera, the first depth image, and the first segmentation mask; and projecting the second segmentation mask comprises projecting the second segmentation mask to the viewpoint of the first camera to generate the second projected segmentation mask based on a camera intrinsic matrix of the second camera, the relative pose of the first camera and the second camera, the second depth image, and the second segmentation mask.

Clause 11. The method of claim 10, wherein: projecting the first segmentation mask comprises performing a matrix multiplication of the camera intrinsic matrix of the first camera, a matrix representing the relative pose of the first camera and the second camera, a 2-dimensional (2D) array comprising the first depth image, an inverse of the camera intrinsic matrix of the first camera, and the first segmentation mask, and projecting the second segmentation mask comprises performing a matrix multiplication of the camera intrinsic matrix of the second camera, the matrix representing the relative pose of the first camera and the second camera, a 2-dimensional (2D) array comprising the second depth image, an inverse of the camera intrinsic matrix of the second camera, and the second segmentation mask.

Clause 12. The method of any one of claims 9-11, wherein determining the loss value comprise determining the loss value based on the first similarity value, the second similarity value, and a loss regularization factor.

Clause 13. The method of any one of claims 9-12, wherein: the first projected segmentation mask includes a first array of values, the second segmentation mask includes a second array of values, the second projected segmentation mask includes a third array of values, the first segmentation mask includes a fourth array of values, each of the first, second, third, and fourth arrays of values has a width dimension, a height dimension, and an object instance dimension, for each 3-dimensional (3D) coordinate combination of width coordinates in the width dimension, height coordinates in the height dimension, and instance indexes in the object instance dimension: a value in the first array having the 3D coordinate combination indicates a level of confidence that a pixel at a width coordinate of the 3D coordinate combination and a height coordinate of the 3D coordinate combination in a first projected image belongs to an object instance having an instance index of the 3D coordinate combination, a value in the second array having the 3D coordinate combination indicates a level of confidence that a pixel at the width coordinate of the 3D coordinate combination and the height coordinate of the 3D coordinate combination in the second image belongs to the object instance having the instance index of the 3D coordinate combination, a value in the third array having the 3D coordinate combination indicates a level of confidence that a pixel at the width coordinate of the 3D coordinate combination and the height coordinate of the 3D coordinate combination in a second projected image belongs to the object instance having the instance index of the 3D coordinate combination, and a value in the fourth array having the 3D coordinate combination indicates a level of confidence that a pixel at the width coordinate of the 3D coordinate combination and the height coordinate of the 3D coordinate combination in the first image belongs to the object instance having the instance index of the 3D coordinate combination, the method comprises, for each 2-dimensional (2D) coordinate combination of the height coordinates in the height dimension and the width coordinates in the width dimension: as part of converting the first projected segmentation mask to the first semantic mask: identifying a first array maximum value among values in the first array that have a height coordinate of the 2D coordinate combination and a width coordinate of the 2D coordinate combination; generating a ground-truth value by applying a threshold to the first array maximum value; and setting a value in the first semantic mask at the height and width coordinates of the 2D coordinate combination to the ground-truth value; as part of converting the second segmentation mask to the second semantic mask: identifying a second array maximum value among values in the second array that have the height and width coordinates of the 2D coordinate combination; setting a value in the second semantic mask at the height and width coordinates of the 2D coordinate combination to the second array maximum value; as part of converting the second projected segmentation mask to the third semantic mask: identifying a third array maximum value among values in the third array that have the height and width coordinates of the 2D coordinate combination; generating a ground-truth value by applying the threshold to the third array maximum value; and setting a value in the third semantic mask at the height and width coordinates of the 2D coordinate combination to the ground-truth value; and as part of converting the first segmentation mask to the fourth semantic mask: identifying a fourth array maximum value among values in the fourth array that have the height and width coordinates of the 2D coordinate combination; and setting a value in the fourth semantic mask at the height and width coordinates of the 2D coordinate combinations to the fourth array maximum value.

Clause 14. The method of any one of claims 9-13, wherein: computing the first similarity value comprises computing the first similarity value as a first Dice similarity value with the first semantic mask as a first ground truth and the second semantic mask as a first prediction; and computing the second similarity value comprise computing the second similarity value as a second Dice similarity value with the third semantic mask as a second ground truth and the fourth semantic mask as a second prediction.

Clause 15. The method of any one of claims 9-14, wherein the segmentation model is implemented using a SparseInst architecture.

Clause 16. Non-transitory computer-readable storage media having stored thereon instructions that, when executed, cause one or more processors to: store a pair of stereoscopic images, the stereoscopic images including a first image generated by a first camera and a second image generated by a second camera; and apply a segmentation model to the first image to generate a first segmentation mask identifying one or more object instances; apply the segmentation model to the second image to generate a second segmentation mask identifying the one or more object instances; project the first segmentation mask to a viewpoint of the second camera to generate a first projected segmentation mask; convert the first projected segmentation mask to a first semantic mask; convert the second segmentation mask to a second semantic mask; compute a first similarity value based on the first semantic mask and the second semantic mask; project the second segmentation mask to a viewpoint of the first camera to generate a second projected segmentation mask; convert the second projected segmentation mask to a third semantic mask; convert the first segmentation mask to a fourth semantic mask; compute a second similarity value based on the third semantic mask and the fourth semantic mask; determine a loss value based on the first similarity value and the second similarity value; and train the segmentation model based on the loss value.

Clause 17. The non-transitory computer-readable storage media of claim 16, wherein the instructions cause the one or more processors to: obtain a first depth image representing estimates of depths in the first image; obtain a second depth image representing estimates of depths in the second image; project the first segmentation mask to the viewpoint of the second camera to generate the first projected segmentation mask based on a camera intrinsic matrix of the first camera, a relative pose of the first camera and the second camera, the first depth image, and the first segmentation mask; and project the second segmentation mask to the viewpoint of the first camera to generate the second projected segmentation mask based on a camera intrinsic matrix of the second camera, the relative pose of the first camera and the second camera, the second depth image, and the second segmentation mask.

Clause 18. The non-transitory computer-readable storage media of any one of claims 16-17, wherein: the first projected segmentation mask includes a first array of values, the second segmentation mask includes a second array of values, the second projected segmentation mask includes a third array of values, the first segmentation mask includes a fourth array of values, each of the first, second, third, and fourth arrays of values has a width dimension, a height dimension, and an object instance dimension, for each 3-dimensional (3D) coordinate combination of width coordinates in the width dimension, height coordinates in the height dimension, and instance indexes in the object instance dimension: a value in the first array having the 3D coordinate combination indicates a level of confidence that a pixel at a width coordinate of the 3D coordinate combination and a height coordinate of the 3D coordinate combination in a first projected image belongs to an object instance having an instance index of the 3D coordinate combination, a value in the second array having the 3D coordinate combination indicates a level of confidence that a pixel at the width coordinate of the 3D coordinate combination and the height coordinate of the 3D coordinate combination in the second image belongs to the object instance having the instance index of the 3D coordinate combination, a value in the third array having the 3D coordinate combination indicates a level of confidence that a pixel at the width coordinate of the 3D coordinate combination and the height coordinate of the 3D coordinate combination in a second projected image belongs to the object instance having the instance index of the 3D coordinate combination, and a value in the fourth array having the 3D coordinate combination indicates a level of confidence that a pixel at the width coordinate of the 3D coordinate combination and the height coordinate of the 3D coordinate combination in the first image belongs to the object instance having the instance index of the 3D coordinate combination, for each 2-dimensional (2D) coordinate combination of the height coordinates in the height dimension and the width coordinates in the width dimension, the instructions cause the one or more processors to: as part of converting the first projected segmentation mask to the first semantic mask: identify a first array maximum value among values in the first array that have a height coordinate of the 2D coordinate combination and a width coordinate of the 2D coordinate combination; generate a ground-truth value by applying a threshold to the first array maximum value; and set a value in the first semantic mask at the height and width coordinates of the 2D coordinate combination to the ground-truth value; as part of converting the second segmentation mask to the second semantic mask: identify a second array maximum value among values in the second array that have the height and width coordinates of the 2D coordinate combination; set a value in the second semantic mask at the height and width coordinates of the 2D coordinate combination to the second array maximum value; as part of converting the second projected segmentation mask to the third semantic mask: identify a third array maximum value among values in the third array that have the height and width coordinates of the 2D coordinate combination; generate a ground-truth value by applying the threshold to the third array maximum value; and set a value in the third semantic mask at the height and width coordinates of the 2D coordinate combination to the ground-truth value; and as part of converting the first segmentation mask to the fourth semantic mask: identify a fourth array maximum value among values in the fourth array that have the height and width coordinates of the 2D coordinate combination; and set a value in the fourth semantic mask at the height and width coordinates of the 2D coordinate combinations to the fourth array maximum value.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A system comprising:

a storage system comprising one or more computer-readable media, the storage system configured to store a pair of stereoscopic images, the stereoscopic images including a first image generated by a first camera and a second image generated by a second camera; and one or more processors implemented in circuitry, the one or more processors configured to:

apply a segmentation model to the first image to generate a first segmentation mask identifying one or more object instances;

apply the segmentation model to the second image to generate a second segmentation mask identifying the one or more object instances;

project the first segmentation mask to a viewpoint of the second camera to generate a first projected segmentation mask;

convert the first projected segmentation mask to a first semantic mask;

convert the second segmentation mask to a second semantic mask and a second semantic mask, respectively;

compute a first similarity value based on the first semantic mask and the second semantic mask;

project the second segmentation mask to a viewpoint of the first camera to generate a second projected segmentation mask;

convert the second projected segmentation mask to a third semantic mask;

convert the first segmentation mask to a fourth semantic mask;

compute a second similarity value based on the third semantic mask and the fourth semantic mask;

determine a loss value based on the first similarity value and the second similarity value; and train the segmentation model based on the loss value.

2. The system of claim 1, wherein the one or more processors are configured to:

obtain a first depth image representing estimates of depths in the first image;

obtain a second depth image representing estimates of depths in the second image;

project the first segmentation mask to the viewpoint of the second camera to generate the first projected segmentation mask based on a camera intrinsic matrix of the first camera, a relative pose of the first camera and the second camera, the first depth image, and the first segmentation mask; and project the second segmentation mask to the viewpoint of the first camera to generate the second projected segmentation mask based on a camera intrinsic matrix of the second camera, the relative pose of the first camera and the second camera, the second depth image, and the second segmentation mask.

3. The system of claim 2, further comprising:

a first depth camera configured to generate the first depth image; and a second depth camera configured to generate the second depth image.

4. The system of claim 2, wherein the one or more processors are configured to:

as part of projecting the first segmentation mask, perform a matrix multiplication of the camera intrinsic matrix of the first camera, a matrix representing the relative pose of the first camera and the second camera, a 2-dimensional (2D) array comprising the first depth image, an inverse of the camera intrinsic matrix of the first camera, and the first segmentation mask, and as part of projecting the second segmentation mask, perform a matrix multiplication of the camera intrinsic matrix of the second camera, the matrix representing the relative pose of the first camera and the second camera, a 2-dimensional (2D) array comprising the second depth image, an inverse of the camera intrinsic matrix of the second camera, and the second segmentation mask.

5. The system of claim 1, wherein the one or more processors are configured to determine the loss value based on the first similarity value, the second similarity value, and a loss regularization factor.

6. The system of claim 1, wherein:

the first projected segmentation mask includes a first array of values, the second segmentation mask includes a second array of values, the second projected segmentation mask includes a third array of values, the first segmentation mask includes a fourth array of values, each of the first, second, third, and fourth arrays of values has a width dimension, a height dimension, and an object instance dimension, for each 3-dimensional (3D) coordinate combination of width coordinates in the width dimension, height coordinates in the height dimension, and instance indexes in the object instance dimension:

a value in the first array having the 3D coordinate combination indicates a level of confidence that a pixel at a width coordinate of the 3D coordinate combination and a height coordinate of the 3D coordinate combination in a first projected image belongs to an object instance having an instance index of the 3D coordinate combination, a value in the second array having the 3D coordinate combination indicates a level of confidence that a pixel at the width coordinate of the 3D coordinate combination and the height coordinate of the 3D coordinate combination in the second image belongs to the object instance having the instance index of the 3D coordinate combination, a value in the third array having the 3D coordinate combination indicates a level of confidence that a pixel at the width coordinate of the 3D coordinate combination and the height coordinate of the 3D coordinate combination in a second projected image belongs to the object instance having the instance index of the 3D coordinate combination, and a value in the fourth array having the 3D coordinate combination indicates a level of confidence that a pixel at the width coordinate of the 3D coordinate combination and the height coordinate of the 3D coordinate combination in the first image belongs to the object instance having the instance index of the 3D coordinate combination, for each 2-dimensional (2D) coordinate combination of the height coordinates in the height dimension and the width coordinates in the width dimension, the one or more processors are configured to:

as part of converting the first projected segmentation mask to the first semantic mask:

identify a first array maximum value among values in the first array that have a height coordinate of the 2D coordinate combination and a width coordinate of the 2D coordinate combination;

generate a ground-truth value by applying a threshold to the first array maximum value; and set a value in the first semantic mask at the height and width coordinates of the 2D coordinate combination to the ground-truth value;

as part of converting the second segmentation mask to the second semantic mask:

identify a second array maximum value among values in the second array that have the height and width coordinates of the 2D coordinate combination;

set a value in the second semantic mask at the height and width coordinates of the 2D coordinate combination to the second array maximum value;

as part of converting the second projected segmentation mask to the third semantic mask:

identify a third array maximum value among values in the third array that have the height and width coordinates of the 2D coordinate combination;

generate a ground-truth value by applying the threshold to the third array maximum value; and set a value in the third semantic mask at the height and width coordinates of the 2D coordinate combination to the ground-truth value; and as part of converting the first segmentation mask to the fourth semantic mask:

identify a fourth array maximum value among values in the fourth array that have the height and width coordinates of the 2D coordinate combination; and set a value in the fourth semantic mask at the height and width coordinates of the 2D coordinate combinations to the fourth array maximum value.

7. The system of claim 1, wherein the one or more processors are configured to:

compute the first similarity value as a first Dice similarity value with the first semantic mask as a first ground truth and the second semantic mask as a first prediction; and compute the second similarity value as a second Dice similarity value with the third semantic mask as a second ground truth and the fourth semantic mask as a second prediction.

8. The system of claim 1, wherein the segmentation model is implemented using a SparseInst architecture.

9. A method comprising:

storing a pair of stereoscopic images, the stereoscopic images including a first image generated by a first camera and a second image generated by a second camera; and applying a segmentation model to the first image to generate a first segmentation mask identifying one or more object instances;

applying the segmentation model to the second image to generate a second segmentation mask identifying the one or more object instances;

projecting the first segmentation mask to a viewpoint of the second camera to generate a first projected segmentation mask;

converting the first projected segmentation mask to a first semantic mask;

converting the second segmentation mask to a second semantic mask;

computing a first similarity value based on the first semantic mask and the second semantic mask;

projecting the second segmentation mask to a viewpoint of the first camera to generate a second projected segmentation mask;

converting the second projected segmentation mask to a third semantic mask;

converting the first segmentation mask to a fourth semantic mask;

computing a second similarity value based on the third semantic mask and the fourth semantic mask;

determining a loss value based on the first similarity value and the second similarity value; and training the segmentation model based on the loss value.

10. The method of claim 9, wherein:

the method further comprises:

obtaining a first depth image representing estimates of depths in the first image; and obtaining a second depth image representing estimates of depths in the second image;

projecting the first segmentation mask comprises projecting the first segmentation mask to the viewpoint of the second camera to generate the first projected segmentation mask based on a camera intrinsic matrix of the first camera, a relative pose of the first camera and the second camera, the first depth image, and the first segmentation mask; and projecting the second segmentation mask comprises projecting the second segmentation mask to the viewpoint of the first camera to generate the second projected segmentation mask based on a camera intrinsic matrix of the second camera, the relative pose of the first camera and the second camera, the second depth image, and the second segmentation mask.

11. The method of claim 10, wherein:

projecting the first segmentation mask comprises performing a matrix multiplication of the camera intrinsic matrix of the first camera, a matrix representing the relative pose of the first camera and the second camera, a 2-dimensional (2D) array comprising the first depth image, an inverse of the camera intrinsic matrix of the first camera, and the first segmentation mask, and projecting the second segmentation mask comprises performing a matrix multiplication of the camera intrinsic matrix of the second camera, the matrix representing the relative pose of the first camera and the second camera, a 2-dimensional (2D) array comprising the second depth image, an inverse of the camera intrinsic matrix of the second camera, and the second segmentation mask.

12. The method of claim 9, wherein determining the loss value comprise determining the loss value based on the first similarity value, the second similarity value, and a loss regularization factor.

13. The method of claim 9, wherein:

the first projected segmentation mask includes a first array of values, the second segmentation mask includes a second array of values, the second projected segmentation mask includes a third array of values, the first segmentation mask includes a fourth array of values, each of the first, second, third, and fourth arrays of values has a width dimension, a height dimension, and an object instance dimension, for each 3-dimensional (3D) coordinate combination of width coordinates in the width dimension, height coordinates in the height dimension, and instance indexes in the object instance dimension:

a value in the first array having the 3D coordinate combination indicates a level of confidence that a pixel at a width coordinate of the 3D coordinate combination and a height coordinate of the 3D coordinate combination in a first projected image belongs to an object instance having an instance index of the 3D coordinate combination, a value in the second array having the 3D coordinate combination indicates a level of confidence that a pixel at the width coordinate of the 3D coordinate combination and the height coordinate of the 3D coordinate combination in the second image belongs to the object instance having the instance index of the 3D coordinate combination, a value in the third array having the 3D coordinate combination indicates a level of confidence that a pixel at the width coordinate of the 3D coordinate combination and the height coordinate of the 3D coordinate combination in a second projected image belongs to the object instance having the instance index of the 3D coordinate combination, and a value in the fourth array having the 3D coordinate combination indicates a level of confidence that a pixel at the width coordinate of the 3D coordinate combination and the height coordinate of the 3D coordinate combination in the first image belongs to the object instance having the instance index of the 3D coordinate combination, the method comprises, for each 2-dimensional (2D) coordinate combination of the height coordinates in the height dimension and the width coordinates in the width dimension:

as part of converting the first projected segmentation mask to the first semantic mask:

identifying a first array maximum value among values in the first array that have a height coordinate of the 2D coordinate combination and a width coordinate of the 2D coordinate combination;

generating a ground-truth value by applying a threshold to the first array maximum value; and setting a value in the first semantic mask at the height and width coordinates of the 2D coordinate combination to the ground-truth value;

as part of converting the second segmentation mask to the second semantic mask:

identifying a second array maximum value among values in the second array that have the height and width coordinates of the 2D coordinate combination;

setting a value in the second semantic mask at the height and width coordinates of the 2D coordinate combination to the second array maximum value;

as part of converting the second projected segmentation mask to the third semantic mask:

identifying a third array maximum value among values in the third array that have the height and width coordinates of the 2D coordinate combination;

generating a ground-truth value by applying the threshold to the third array maximum value; and setting a value in the third semantic mask at the height and width coordinates of the 2D coordinate combination to the ground-truth value; and as part of converting the first segmentation mask to the fourth semantic mask:

identifying a fourth array maximum value among values in the fourth array that have the height and width coordinates of the 2D coordinate combination; and setting a value in the fourth semantic mask at the height and width coordinates of the 2D coordinate combinations to the fourth array maximum value.

14. The method of claim 9, wherein:

computing the first similarity value comprises computing the first similarity value as a first Dice similarity value with the first semantic mask as a first ground truth and the second semantic mask as a first prediction; and computing the second similarity value comprise computing the second similarity value as a second Dice similarity value with the third semantic mask as a second ground truth and the fourth semantic mask as a second prediction.

15. The method of claim 9, wherein the segmentation model is implemented using a SparseInst architecture.

16. Non-transitory computer-readable storage media having stored thereon instructions that, when executed, cause one or more processors to:

store a pair of stereoscopic images, the stereoscopic images including a first image generated by a first camera and a second image generated by a second camera; and apply a segmentation model to the first image to generate a first segmentation mask identifying one or more object instances;

apply the segmentation model to the second image to generate a second segmentation mask identifying the one or more object instances;

project the first segmentation mask to a viewpoint of the second camera to generate a first projected segmentation mask;

convert the first projected segmentation mask to a first semantic mask;

convert the second segmentation mask to a second semantic mask;

compute a first similarity value based on the first semantic mask and the second semantic mask;

project the second segmentation mask to a viewpoint of the first camera to generate a second projected segmentation mask;

convert the second projected segmentation mask to a third semantic mask;

convert the first segmentation mask to a fourth semantic mask;

compute a second similarity value based on the third semantic mask and the fourth semantic mask;

determine a loss value based on the first similarity value and the second similarity value; and train the segmentation model based on the loss value.

17. The non-transitory computer-readable storage media of claim 16, wherein the instructions cause the one or more processors to:

obtain a first depth image representing estimates of depths in the first image;

obtain a second depth image representing estimates of depths in the second image;

project the first segmentation mask to the viewpoint of the second camera to generate the first projected segmentation mask based on a camera intrinsic matrix of the first camera, a relative pose of the first camera and the second camera, the first depth image, and the first segmentation mask; and project the second segmentation mask to the viewpoint of the first camera to generate the second projected segmentation mask based on a camera intrinsic matrix of the second camera, the relative pose of the first camera and the second camera, the second depth image, and the second segmentation mask.

18. The non-transitory computer-readable storage media of claim 16, wherein:

the first projected segmentation mask includes a first array of values, the second segmentation mask includes a second array of values, the second projected segmentation mask includes a third array of values, the first segmentation mask includes a fourth array of values, each of the first, second, third, and fourth arrays of values has a width dimension, a height dimension, and an object instance dimension, for each 3-dimensional (3D) coordinate combination of width coordinates in the width dimension, height coordinates in the height dimension, and instance indexes in the object instance dimension:

a value in the first array having the 3D coordinate combination indicates a level of confidence that a pixel at a width coordinate of the 3D coordinate combination and a height coordinate of the 3D coordinate combination in a first projected image belongs to an object instance having an instance index of the 3D coordinate combination, a value in the second array having the 3D coordinate combination indicates a level of confidence that a pixel at the width coordinate of the 3D coordinate combination and the height coordinate of the 3D coordinate combination in the second image belongs to the object instance having the instance index of the 3D coordinate combination, a value in the third array having the 3D coordinate combination indicates a level of confidence that a pixel at the width coordinate of the 3D coordinate combination and the height coordinate of the 3D coordinate combination in a second projected image belongs to the object instance having the instance index of the 3D coordinate combination, and a value in the fourth array having the 3D coordinate combination indicates a level of confidence that a pixel at the width coordinate of the 3D coordinate combination and the height coordinate of the 3D coordinate combination in the first image belongs to the object instance having the instance index of the 3D coordinate combination, for each 2-dimensional (2D) coordinate combination of the height coordinates in the height dimension and the width coordinates in the width dimension, the instructions cause the one or more processors to:

as part of converting the first projected segmentation mask to the first semantic mask:

identify a first array maximum value among values in the first array that have a height coordinate of the 2D coordinate combination and a width coordinate of the 2D coordinate combination;

generate a ground-truth value by applying a threshold to the first array maximum value; and set a value in the first semantic mask at the height and width coordinates of the 2D coordinate combination to the ground-truth value;

as part of converting the second segmentation mask to the second semantic mask:

identify a second array maximum value among values in the second array that have the height and width coordinates of the 2D coordinate combination;

set a value in the second semantic mask at the height and width coordinates of the 2D coordinate combination to the second array maximum value;

as part of converting the second projected segmentation mask to the third semantic mask:

identify a third array maximum value among values in the third array that have the height and width coordinates of the 2D coordinate combination;

generate a ground-truth value by applying the threshold to the third array maximum value; and set a value in the third semantic mask at the height and width coordinates of the 2D coordinate combination to the ground-truth value; and as part of converting the first segmentation mask to the fourth semantic mask:

identify a fourth array maximum value among values in the fourth array that have the height and width coordinates of the 2D coordinate combination; and set a value in the fourth semantic mask at the height and width coordinates of the 2D coordinate combinations to the fourth array maximum value.

* * * * *